United States Patent
Spielman et al.

(10) Patent No.: US 10,914,600 B1
(45) Date of Patent: Feb. 9, 2021

(54) TRANSPORTATION PROPOSAL FILTRATION, COMPARISON, AND INCONVENIENCE MEASUREMENT

(71) Applicant: Lyft, Inc., San Francisco, CA (US)

(72) Inventors: Charles Parker Spielman, San Francisco, CA (US); Mayank Gulati, San Francisco, CA (US); Karina Goot, San Francisco, CA (US); Priyanka Madhav Phatak, San Francisco, CA (US); Michael Francis Lodick, San Francisco, CA (US); Jatin Chopra, San Francisco, CA (US); David Louis Bergman Quaid, New York, NY (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 16/595,429

(22) Filed: Oct. 7, 2019

(51) Int. Cl.
*G01C 21/34* (2006.01)
*G06Q 30/02* (2012.01)

(52) U.S. Cl.
CPC ..... *G01C 21/3453* (2013.01); *G06Q 30/0284* (2013.01)

(58) Field of Classification Search
CPC .......... G01C 21/3453; G06Q 30/0284
See application file for complete search history.

(56) References Cited

U.S. PATENT DOCUMENTS

| | | | |
|---|---|---|---|
| 6,208,934 B1* | 3/2001 | Bechtolsheim .... | G01C 21/3423 340/988 |
| 10,545,026 B1* | 1/2020 | Schaefer ............ | G01C 21/3484 |
| 2008/0248815 A1* | 10/2008 | Busch ................ | H04L 67/18 455/456.5 |
| 2011/0004047 A1 | 2/2011 | Uyama | |
| 2012/0010816 A1 | 1/2012 | Uyama et al. | |
| 2013/0016012 A1* | 1/2013 | Beauregard ......... | H04W 64/00 342/450 |
| 2014/0000594 A1 | 1/2014 | Paek et al. | |
| 2016/0203422 A1* | 7/2016 | Demarchi ........... | G06F 16/29 705/6 |
| 2016/0298977 A1* | 10/2016 | Newlin .............. | G01C 21/3423 |
| 2016/0356603 A1* | 12/2016 | Hajj .................. | G01C 21/20 |

(Continued)

OTHER PUBLICATIONS

International Search Report and Written Opinion for App. No. PCT/US20/46673 dated Nov. 9, 2020 (8 pages).

*Primary Examiner* — Sze-Hon Kong
(74) *Attorney, Agent, or Firm* — K&L Gates LLP

(57) ABSTRACT

Methods and systems for analyzing, ranking, and presenting multi-modality transportation proposals are presented. In one embodiment, a method is provided that includes receiving a request for transportation and generating proposals that include routes for transportation an origin location and a destination location of the request. The proposals each include segment(s) corresponding to a portion of a route and at least one modality identifying a type of transportation for the segment(s). Proposal scores may then be calculated for each of the proposals. Proposal scores for a proposal may be calculated based on a disutility measure of the proposal that measures a predicted inconvenience for a user following the route identified by the proposal. The proposals may be ranked based on the proposal scores and the ranking may be transmitted to a mobile device for display on the mobile device.

16 Claims, 7 Drawing Sheets

(56) References Cited

U.S. PATENT DOCUMENTS

| | | | | |
|---|---|---|---|---|
| 2016/0358471 A1* | 12/2016 | Hajj | ................... | G01C 21/3423 |
| 2017/0191841 A1* | 7/2017 | Marueli | ............. | G01C 21/3484 |
| 2017/0370735 A1* | 12/2017 | Salowitz | ........... | G01C 21/3415 |
| 2018/0113914 A1* | 4/2018 | Mehedy | ................ | G06F 16/248 |
| 2018/0211337 A1* | 7/2018 | Ghaddar | ................ | G06Q 50/30 |
| 2018/0374032 A1* | 12/2018 | Pan | ..................... | G06Q 10/083 |
| 2019/0101401 A1* | 4/2019 | Balva | ................. | G01C 21/3438 |
| 2019/0277642 A1* | 9/2019 | Schmelzer | ......... | G01C 21/3407 |
| 2019/0318309 A1* | 10/2019 | Vaideeswaran | ...... | G06Q 10/047 |
| 2019/0375301 A1 | 12/2019 | Whitt et al. | | |
| 2019/0383623 A1* | 12/2019 | Aich | ................. | G01C 21/3423 |
| 2020/0041291 A1* | 2/2020 | Dunnette | .......... | G06Q 30/0283 |
| 2020/0051192 A1* | 2/2020 | Didier | ................. | G01C 21/343 |
| 2020/0104761 A1* | 4/2020 | Aich | ................. | G06Q 20/3224 |
| 2020/0104962 A1* | 4/2020 | Aich | ..................... | G06Q 50/30 |
| 2020/0109956 A1* | 4/2020 | Nakamura | ......... | G01C 21/3415 |
| 2020/0134765 A1* | 4/2020 | Majima | ................. | G06Q 10/02 |

* cited by examiner

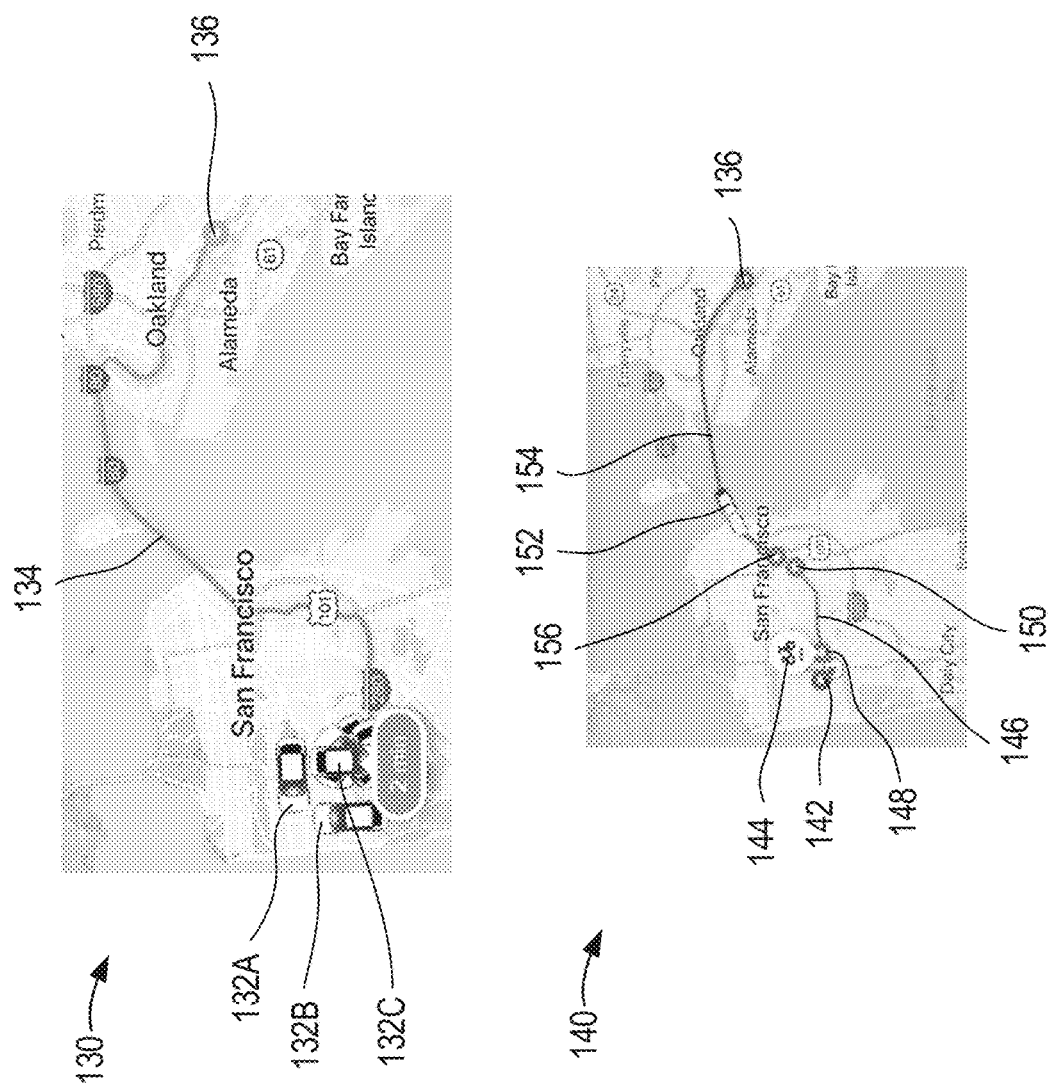

TRANSPORTATION PROPOSAL FILTRATION, COMPARISON, AND INCONVENIENCE MEASUREMENT

BACKGROUND

Individuals desiring transportation (e.g., transportation by vehicle) between two locations can submit transportation requests to transportation providers. In particular, users may identify specific locations between which transportation is desired. In response, transportation providers may identify multiple modes of transportation that may be used to transport the user between the identified locations.

SUMMARY

The present disclosure presents new and innovative systems and methods for analyzing, ranking, and presenting multi-modality transportation proposals. In a first aspect, a system is provided that includes a processor and a memory. The memory may store instructions which, when executed by the processor, cause the processor to receive, from a mobile device, a request for transportation from an origin location to a destination location and generate at least a first proposal and a second proposal, each proposal identifying a route for transportation between the origin location and the destination location. The first and second proposals may include (i) at least one segment corresponding to a portion of the route and (ii) at least one modality identifying a type of transportation for each of the at least one segments. The memory may store further instructions which, when executed by the processor, cause the processor to calculate proposal scores for each of the first and second proposals, wherein the proposal score for each proposal is calculated based on a disutility measure of the proposal, the disutility measure measuring a predicted inconvenience for a user following the route identified by the proposal. The memory may store still further instructions which, when executed by the processor, cause the processor to rank the first and second proposals based on the proposal scores and transmit the ranking of the first and second proposals to the mobile device, wherein the mobile device displays at least an indication of the ranking of the first and second proposals.

In a second aspect according to the first aspect, the disutility measure is calculated based on at least one of a total backtracking distance for the route identified by the proposal, a total walking distance for the route identified by the proposal, and a total distance traveled by personal mobility vehicle for the route identified by the proposal.

In a third aspect according to the second aspect, the total backtracking distance is measured as an increase in a distance to the destination location as a result of completing the at least one segment of the proposal.

In a fourth aspect according to any of the second and third aspects, the personal mobility vehicle includes one or more of a scooter and a bike.

In a fifth aspect according to the fourth aspect the disutility measure is calculated based on a comparison of the total distance traveled by personal mobility vehicle to the total walking distance.

In a sixth aspect according to any of the first through fifth aspects, the proposal score is further calculated based on at least one of: a total travel time of the proposal, a price of the proposal, and a cost of providing transportation according to the proposal In a seventh aspect according to any of the first through sixth aspects, the proposal score is calculated based on a health measure of the proposal selected from the group consisting of: calories expended following the route identified by the proposal, steps taken following the route identified by the proposal, distance walked following the route identified by the proposal, and distance traveled by bike following the route identified by the proposal.

In an eighth aspect according to any of the first through seventh aspects, the proposal score is calculated based on a safety measure of at least one segment of the proposal.

In a ninth aspect according to the eighth aspect, the safety measure is determined based on current safety conditions and the at least one segment corresponds to a personal mobility vehicle.

In a tenth aspect according to any of the first through ninth aspects, the memory stores further instructions which, when executed by the processor before transmitting the ranking, cause the processor to remove at least one of the first proposal and the second proposal from consideration.

In an eleventh aspect according to the tenth aspect, the at least one of the first proposal and the second proposal are removed based on previous selections of proposals associated with a user profile associated with the mobile device.

In a twelfth aspect according to the any of the tenth and eleventh aspects, the at least one of the first proposal and the second proposal are removed based on operating conditions for at least one of the first proposal and the second proposal, the operating conditions specifying current or future locations of vehicles associated with at least one modality of the at least one of the first and second proposal In a thirteenth aspect according to the twelfth aspect, the operating conditions specify a likelihood that vehicles associated with the at least one modality will be available to serve a segment associated with the at least one modality.

In a fourteenth aspect according to any of the first through thirteenth aspects, the mobile device displays a higher-ranked proposal between the first proposal and the second proposal higher than a lower-ranked proposal between the first proposal and the second proposal.

In a fifteenth aspect according to any of the first through fourteenth aspects, the mobile device displays the at least one modality for each of the at least one segments of the first proposal and the second proposal.

In a sixteenth aspects, a method is provided including receiving, from a mobile device, a request for transportation from an origin location to a destination location and generating at least a first proposal and a second proposal, each proposal identifying a route for transportation between the origin location and the destination location. Each of the first and second proposal may include (i) at least one segment corresponding to a portion of the route and (ii) at least one modality identifying a type of transportation for each of the at least one segments. The method may further include calculating proposal scores for each of the first and second proposals, wherein the proposal score for each proposal is calculated based on a disutility measure of the proposal, the disutility measure measuring a predicted inconvenience for a user following the route identified by the proposal. The method may still further include ranking the first and second proposals based on the proposal scores and transmitting the ranking of the first and second proposals to the mobile device, wherein the mobile device displays at least an indication of the ranking of the first and second proposals.

In a seventeenth aspect according to the sixteenth aspect, the disutility measure is calculated based on at least one of a total backtracking distance for the route identified by the proposal, a total walking distance for the route identified by the proposal, and a total distance traveled by personal mobility vehicle for the route identified by the proposal.

In an eighteenth aspect according to the seventeenth aspect, the total backtracking distance is measured as an increase in a distance to the destination location as a result of completing the at least one segment of the proposal.

In a nineteenth aspect according to any of the seventeenth and eighteenth aspects, the personal mobility vehicle includes one or more of a scooter and a bike.

In a twentieth aspect according to the nineteenth aspect, the disutility measure is calculated based on a comparison of the total distance traveled by personal mobility vehicle to the total walking distance.

In a twenty-first aspect according to any of the sixteenth through twentieth aspect, the proposal score is further calculated based on at least one of: a total travel time of the proposal, a price of the proposal, and a cost of providing transportation according to the proposal In a twenty-second aspect according to any of the sixteenth through twenty-first aspects, the proposal score is calculated based on a health measure of the proposal selected from the group consisting of: calories expended following the route identified by the proposal, steps taken following the route identified by the proposal, distance walked following the route identified by the proposal, and distance traveled by bike following the route identified by the proposal.

In a twenty-third aspect according to any of the sixteenth through twenty-second aspects, the proposal score is calculated based on a safety measure of at least one segment of the proposal.

In a twenty-fourth aspect according to the twenty-third aspect, the safety measure is determined based on current safety conditions and the at least one segment corresponds to a personal mobility vehicle.

In a twenty-fifth aspect according to any of the sixteenth through twenty-fourth aspects, the method further includes, before transmitting the ranking, removing at least one of the first proposal and the second proposal from consideration.

In a twenty-sixth aspect according to the twenty-fifth aspect, the at least one of the first proposal and the second proposal are removed based on previous selections of proposals associated with a user profile associated with the mobile device.

In a twenty-seventh aspect according to any of the twenty-fifth through twenty-sixth aspects, the at least one of the first proposal and the second proposal are removed based on operating conditions for at least one of the first proposal and the second proposal, the operating conditions specifying current or future locations of vehicles associated with at least one modality of the at least one of the first and second proposal In a twenty-eighth aspect according to the twenty-seventh aspect, the operating conditions specify a likelihood that vehicles associated with the at least one modality will be available to serve a segment associated with the at least one modality.

In a twenty-ninth aspect according to any of the sixteenth through twenty-eighth aspect, the mobile device displays a higher-ranked proposal between the first proposal and the second proposal higher than a lower-ranked proposal between the first proposal and the second proposal.

In a thirtieth aspect according to any of the sixteenth through twenty-ninth aspects, the mobile device displays the at least one modality for each of the at least one segments of the first proposal and the second proposal.

In a thirty-first aspect, a non-transitory, computer-readable medium is provided storing instructions which, when executed by a processor, cause the processor to receive, from a mobile device, a request for transportation from an origin location to a destination location and generate at least a first proposal and a second proposal, each proposal identifying a route for transportation between the origin location and the destination location. Each of the first and second proposal may include (i) at least one segment corresponding to a portion of the route and (ii) at least one modality identifying a type of transportation for each of the at least one segments. The non-transitory, computer-readable medium may store further instructions which, when executed by a processor, cause the processor to calculate proposal scores for each of the first and second proposals, wherein the proposal score for each proposal is calculated based on a disutility measure of the proposal, the disutility measure measuring a predicted inconvenience for a user following the route identified by the proposal. The non-transitory, computer-readable medium may store still further instructions which, when executed by a processor, cause the processor to rank the first and second proposals based on the proposal scores and transmit the ranking of the first and second proposals to the mobile device, wherein the mobile device displays at least an indication of the ranking of the first and second proposals.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

BRIEF DESCRIPTION OF THE FIGURES

FIG. 1B illustrates transportation routes according to exemplary embodiments of the present disclosure.

DETAILED DESCRIPTION OF EXAMPLE EMBODIMENTS

Figure 1A:
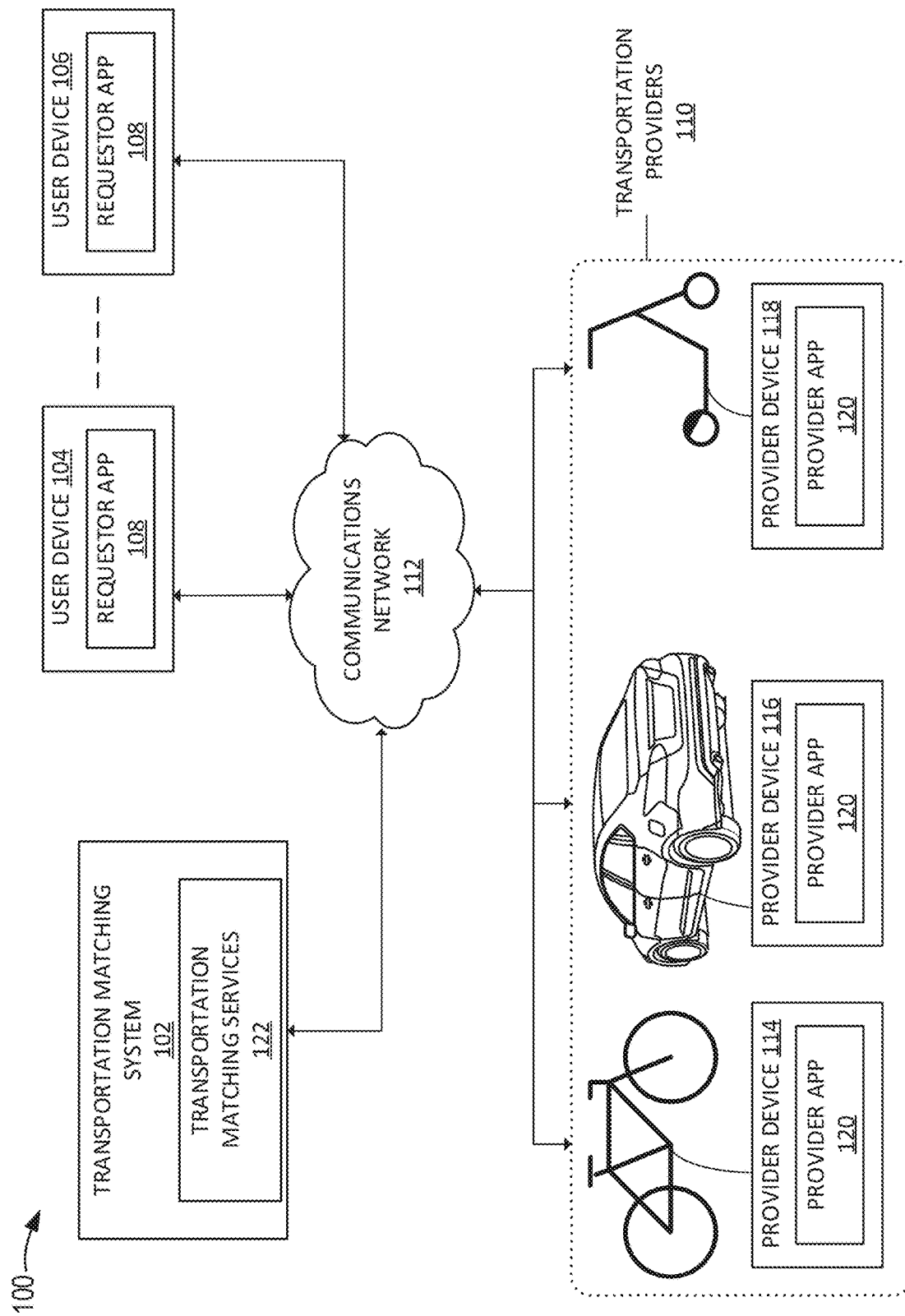
FIG. 1A illustrates a transportation matching system according to exemplary embodiments of the present disclosure.

Aspects of the present disclosure involve systems and methods for analyzing and comparing transportation route proposals that include one or more transportation segments. In various aspects, the disclosed system may generate one or more transportation route proposals and rank the transportation route proposals based on a proposal score of each transportation proposal. The ranking of transportation route proposals may be sent to a user device for display. Techniques related to those discussed in the present disclosure are also discussed in (i) U.S. application Ser. No. 16/595, 399, filed on Oct. 7, 2019, and titled "MULTI-MODAL TRANSPORTATION PROPOSAL GENERATION," (ii) U.S. application Ser. No. 16/595,387, filed on Oct. 7, 2019, and titled "MULTI-MODAL TRANSPORTATION ROUTE DEVIATION DETECTION AND CORRECTION," and (iii) U.S. application Ser. No. 16/595,384, filed on Oct. 7, 2019, and titled "TRANSPORTATION ROUTE PLANNING AND GENERATION." The disclosures of these applications are hereby incorporated by reference.

Various processes and systems currently exist for determining transportation proposals that identify transportation routes between two locations, such as an origin location and a destination location. For example, many transportation providers use such processes and systems to provision vehicles for transporting users from a first, starting location, to a second, ending location. Transportation providers may include transportation networking companies (TNCs). TNCs may implement a transportation system that matches transportation requests with a dynamic transportation network of vehicles. In certain instances, the vehicles may include road-going vehicles and/or personal mobility vehicles. In some examples, some of the vehicles may be standard commercially available vehicles and some of the vehicles may be owned and/or operated by individuals. In some implementations, the vehicles may additionally or alternatively be autonomous (or partly autonomous). Accordingly, throughout the instant disclosure, references to a "vehicle operator" (or an "operator") may, where appropriate, refer to a human driving a vehicle, an autonomous vehicle control system, an autonomous vehicle, an owner of an autonomous vehicle, an operator of an autonomous vehicle, an attendant of an autonomous vehicle, a requesting user piloting a vehicle, and/or an autonomous system for piloting a vehicle. In one example, the TNC may implement multiple transportation systems, where each transportation system is responsible for coordinating transportation matching for a specific geographic region or set number of vehicles.

The transportation system may communicate with computing devices associated with the vehicles in the network, which may be separate computing devices and/or may be computing devices that are integrated into the respective vehicles. In some examples, one or more of the computing devices may be mobile devices, such as a smart phone. Additionally or alternatively, one or more of the computing devices may be tablet computers, personal digital assistants, or any other type or form of mobile computing device. Additionally, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or an operator for a transportation matching application, a navigation application, and/or any other application suited for use by requestors and/or operators). Additionally or alternatively, one or more of the computing devices may be devices suitable for installing in a vehicle and/or may be a vehicle's computer that has a transportation management system application installed on the computer to provide transportation services to transportation requestors and/or communicate with the transportation system.

FIG. 1A illustrates an example system 100 for matching transportation requests to a network of transportation vehicles according to one embodiment of the present disclosure. As illustrated, a transportation matching system 102 may communicate with user devices 104-106 requesting transportation. In some examples, the user devices 104-106 requesting transportation may include a requestor app 108 implemented by the transportation provider. The requestor app 108 may represent any application, program, and/or module that may provide one or more services related to requesting transportation services. For example, the requestor app 108 may include a transportation matching application for requestors. In some examples, the requestor app may match the user of the requestor app 108 (e.g., a transportation requestor) with transportation providers 110 through communication with the transportation matching system 102 via the communications network 112. In addition, the requestor app 108 may provide the transportation matching system 102 with information about a requestor (including, e.g., the current location of the requestor) to enable the transportation matching system 102 to provide dynamic transportation matching services for the requestor and one or more transportation providers 110, each of which may include a provider device 114, 116, 118. Each provider device may include a provider app 120, which may be any application program and/or set of instructions that may provide one or more services related to operating a vehicle and/or providing transportation matching services in conjunction with the transportation matching system 102 and the requestor app 108.

In some examples, the requestor app 108 may coordinate communications and/or a payment between a requestor and a transportation provider 110. According to some embodiments, the requestor app 108 may provide a map service, a navigation service, a traffic notification service, and/or a geolocation service. The provider app 120 may provide similar functions. In other implementations, the requestor app 108 may allow users to request access to certain vehicles, such as personal mobility vehicles (e.g., bikes and/or scooters).

The transportation matching system 102 may arrange transportation on an on-demand and/or ad-hoc basis by, e.g., matching one or more transportation requestors with one or more transportation providers 110. For example, the transportation matching system 102 may provide one or more transportation matching services 122 for a networked transportation service, a ridesourcing service, a taxicab service, a car-booking service, an autonomous vehicle service, a personal mobility vehicle service, or some combination and/or derivative thereof. The transportation matching system 102 may include and/or interface with any of a variety of subsystems that may implement, support, and/or improve the transportation matching services 122. For example, the transportation matching services 122 may include or otherwise interface with a matching system (e.g., that matches requestors to ride opportunities and/or that arranges for requestors and/or providers to meet), a mapping system, a routing system (e.g., to help a provider reach a requestor, to help a requestor reach a provider, and/or to help a provider reach a destination), a rating system (e.g., to rate and/or gauge the trustworthiness of a requestor and/or a provider), a payment system, and/or an autonomous or semi-autonomous driving system. The transportation matching system 102 may be implemented on various platforms, including a requestor-owned mobile device, a computing system installed in a vehicle, a server computer system, or any other hardware platform capable of providing transportation matching services to one or more requestors and/or providers.

Existing transportation matching systems are typically configured to identify and provide a particular modality of transportation between starting and ending locations. For example, FIG. 1B depicts a transportation route 130 identifying a particular modality of transportation between a starting location (not labelled) and an ending location 136. The transportation route 130 includes a single transportation segment 134 between the starting location and the ending location 136. The transportation segment 134, as generated, is to be serviced by one of the cars 132A-C. For example, a user requesting transportation from the starting location to the ending location 136 may be picked up by one of the cars 132A-C and driven along the route indicated by the transportation segment 134 to the ending location 136.

In certain implementations, the transportation matching system may analyze and/or recommend transportation routes using modalities other than cars. For example, where the starting location and ending location 136 are closer together (e.g., shorter rides), the transportation matching system may generate transportation routes that utilize a personal mobility vehicle (e.g., a bike or a scooter). As another example, the transportation matching system may determine that a given starting location and/or ending location 136 are near transit stops for public transportation systems. In such a scenario, the transportation matching system may generate a transportation route from the starting location that utilizes a public transportation modality (e.g., a bus or a train).

Typical transportation matching systems, however, may not be able to generate transportation routes that combine multiple modalities into a single transportation proposal. Therefore, such transportation matching systems cannot capture cost or time savings associated with combining multiple modalities into a single transportation proposal. For example, in certain instances (e.g., during rush hour traffic), car-based modalities may be comparatively slower than other modalities, such as bikes or scooters. As another example, during rush hour or periods of high road congestion, it may be faster to take the train (i.e., use a public transit modality) between the two locations rather than to drive (i.e., use a automobile modality) between the two locations. In such a scenario, existing transportation matching systems may recommend public transportation modalities between starting and ending locations for users located near transit stops. But such a recommendation may not be useful for all users. For instance, users that are not in close proximity to a transit stop may have to walk long distances over a significant amount of time to access the transit stop from their starting location. Alternatively, such users may have to walk long distances over a significant amount of time to leave a transit stop and arrive at their ending location. In either scenario, using public transportation may be slower than traveling by car. Such users may therefore be recommended transportation routes using cars, such as the cars 132A-C.

Nevertheless, even users located far away from public transportation may receive faster transportation if they were able to use other modalities for transportation to the transit stops. For example, FIG. 1B also depicts a transportation route 140 for transportation between starting location 142, which corresponds to the starting location of the transportation route 130, and ending location 136. Rather than fulfilling the entire transportation route 140 with a single modality as in the transportation route 130, the transportation route 140 includes two transportation segments 146, 154 fulfilled by two different modalities (e.g., two different types of vehicles 144, 152). In particular, transportation segment 146 is fulfilled by bicycle 144 and transportation segment 154 is fulfilled by train 152. While following the transportation route 140, a user may walk from starting location 142 to location 148 at the beginning of the transportation segment 146 and pick up a bike 144 (e.g., a docked or dockless bike available for short term rental and/or use). The user can then ride the bike 144 from the location 148 to the location 150 at the end of the transportation segment 146 and drop off the bike 144 (e.g., at a bike dock or bike rack) before walking to location 156 at the start of segment 154. The location 156 may correspond to a transit station (e.g., a train station), and the user may board the train 152 for transportation to the ending location 136 at the end of the segment 154.

However, transportation routes that utilize such modalities may also come with drawbacks. For example, users may find transportation routes with too many changes in modality inconvenient. As another example, the availability of certain modalities may change over time and alterations or updates to transportation routes as a result of such changes may also inconvenience users. In a yet another example, certain modalities may vary in transportation time between locations, which may cause users to miss pick-up times for public transportation modalities (e.g., trains and buses), necessitating changes to the transportation route which may inconvenience such users. These complexities, combined with other considerations such as the price a user must pay for the various modalities, may greatly increase the difficulty of comparing between different transportation routes, including both single-modality and multi-modality transportation routes. Accordingly, there exists a need to take these complexities into account and to compare transportation routes including different numbers of modalities and different types of modalities.

One solution to this problem is to generate a list of multi-modality transportation proposals that are ranked based on the complexities described above. More specifically, the disclosed system may calculate a proposal score for each multi-modality transportation proposal. For example, the proposal score may be calculated based on a disutility to a user utilizing a transportation proposal, on a cost to a user of the transportation proposal, and/or a cost to provide transportation according to the transportation proposal (e.g., a cost to a transportation network). Based on the proposal score of each multi-modality transportation proposal, the system may rank the multi-modality transportation proposals (e.g., from best to worst) and transmit the rankings for display (e.g., for display at a graphical user-interface) on a mobile device. In an example, the system may continuously rank and/or re-rank the multi-modality transportation proposals in response to real-time feedback from the transportation matching system indicating real-time changes in marketplace conditions have occurred. For example, when supply and/or demand for a specific modality (e.g., a bike, scooter, or car) increases or decreases, the transportation matching system may automatically adjust an existing transportation proposal or create an additional transportation proposal, which may cause the system to re-rank the multi-modality transportation proposals.

Figure 2:
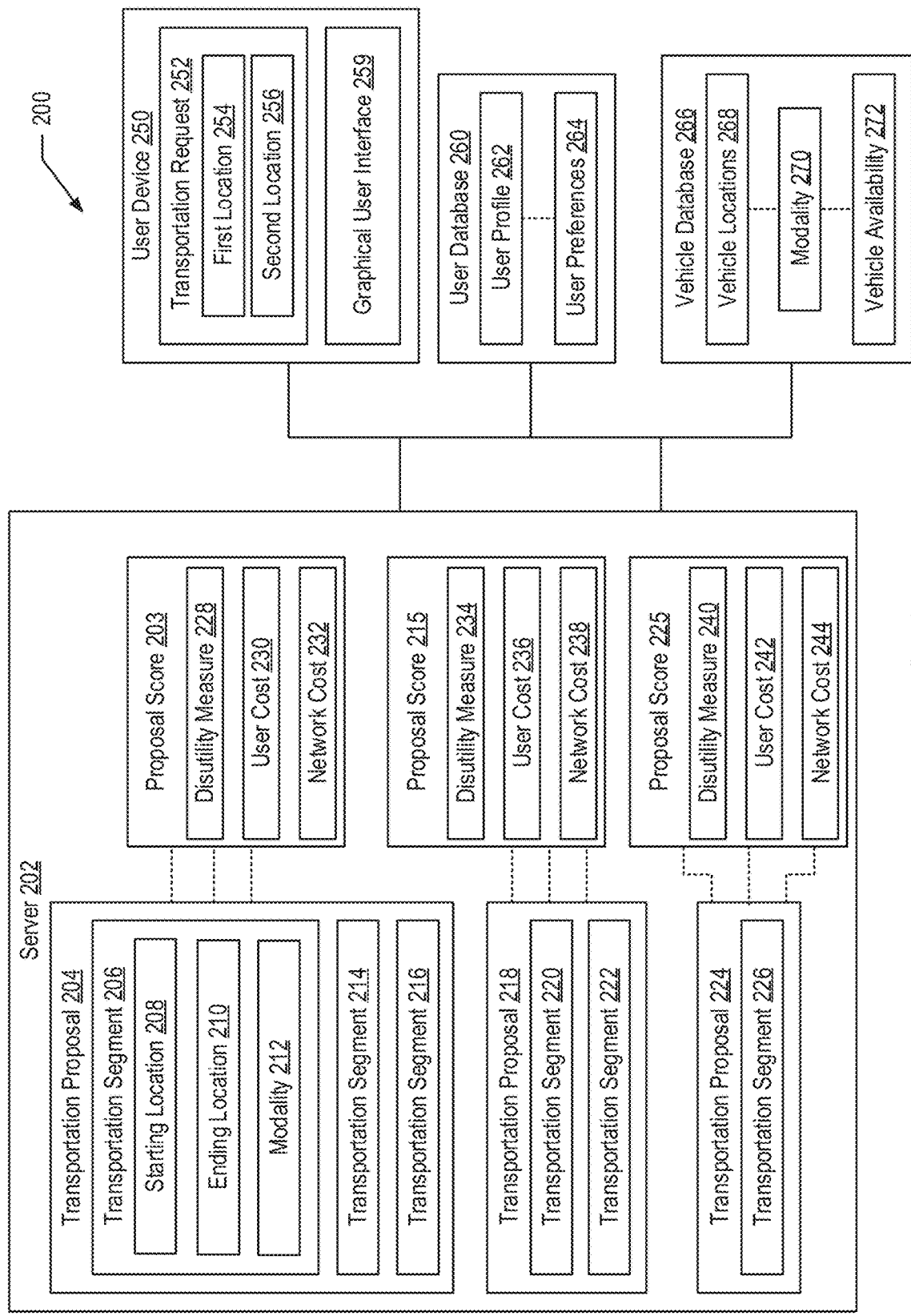
FIG. 2 illustrates a system according to an exemplary embodiment of the present disclosure.

FIG. 2 depicts a system 200 for ranking multi-modality transportation proposals according to an exemplary embodiment of the present disclosure. As illustrated, the system 200 includes a server 202, a user device 250 (e.g., a mobile device), a user database 260, and a vehicle database 266. The server 202 may receive or otherwise obtain one or more transportation proposals 204, 218, and 224. In certain implementations, the server 202 may be configured to generate transportation proposals 204, 218, and 224 in response to transportation requests. For example, the server 202 may receive transportation requests 252 from user devices 250 requesting transportation from a first location 254 to a second location 256 (e.g., in connection with implementing a transportation network and/or transportation matching system). In response to receiving the transportation request 252, the server 202 may generate the transportation proposals 204, 218, and 224. In generating the transportation proposals 204, 218, and 224, the server 202 may create one or more transportation segments 206, 214, 216, 220, 222, and 226. The transportation segment 206 includes a modality 212 identifying a modality, or type of transportation, for the transportation segment 206. The transportation segment 206 also includes a starting location 208 and an ending location 210. In connection with the transportation segment 206, transportation may be provided from the starting location 208 to the ending location 210 according to the modality 212. Although not depicted, transportation segments 214, 216, 220, 222, and 226 may include similar information. The transportation segments 206, 214, 216, 220, 222, and 226 of the same transportation proposal 204, 218, and 224 may be serviced by two or more different modalities 212. For example, the transportation segment 206 may correspond to transportation by car, the transportation segment 214 may correspond to transportation by train, and the transportation segment 216 may correspond to transportation by personal mobility vehicle (e.g., bike and/or scooter). Although FIG. 2 only includes three transportation proposals 204, 218, and 224, it is contemplated that the server 202 may obtain and/or generate any number of transportation proposals, any of which may contain one or more transportation segments.

For each transportation proposal 204, 214, 224, the server 202 may calculate a proposal score 203, 215, 225 that may be used to rank the transportation proposals 204, 218, 224. For example, based on the proposal scores 203, 215, and 225, the transportation proposal 204 may be ranked higher (i.e., considered superior) to the transportation proposal 214. Alternatively, based on the proposal scores 203, 215, and 225, the transportation proposal 224 may be ranked higher (i.e., considered superior) to the transportation proposal 214.

To calculate the proposal scores 203, 215, 225, the system may calculate a series of features that may impact the desirability of a transportation proposal (e.g., to a user receiving transportation according to the transportation proposal). In some implementations, the proposal score 203, 315, 225 may be calculated to determine an overall value of the ride, such as an overall combined value of the transportation proposal to the user and to a TNC providing the transportation. To calculate the proposal score, the system may consider multiple features, including features regarding the price of the transportation proposal, a cost of providing transportation according to the transportation proposal, an inconvenience or disutility to a user receiving transportation according to the transportation proposal, and a total travel time associated with the transportation proposal.

For example, in one embodiment, the system may calculate or otherwise generate a disutility measure 228, 234, 240 that quantifies a level of inconvenience a user may experience while attempting to travel along a route identified by a transportation proposal. In one example, the disutility measure may be calculated based on one or more of a total backtracking distance of the route, a total walking distance of the route, and/or a total distance traveled by personal mobility vehicle for the route. In other implementations, the disutility measure may additionally or alternatively be calculated based on one or more of a total route completion time of the route, a total travel distance of the route, a total waiting time of the route, a number of transportation segments of the route, a total walking time to pick-up location(s) along the route, and/or a complexity of the route. The complexity of the route may incorporate how many transportation segments are involved in a transportation proposal, how many transfers the transportation proposal requires, a likelihood of being delayed for one or more transportation segments of the transportation proposal, a likelihood of missing a transfer for one or more transportation segments of the transportation proposal, a level of physical activity required for one or more transportation segments of the transportation proposal, and/or a level of coordination required for one or more transportation segments of the transportation proposal. In still further implementations, the disutility measure 234 may be calculated based at least in part on a safety measure for one or more of the transportation segments (e.g., for a modality identified by at least one of the transportation segments of the transportation proposal). For example, the safety measure may be calculated based on safety conditions including road traffic levels, speed limits, weather, visibility, and inclines/declines along a route identified by the transportation segments. In the illustrated embodiment, a disutility measure 228 is generated for the transportation proposal 204. Additionally, a disutility measure 234 is generated for the transportation proposal 218. Finally, a disutility measure 240 is generated for the transportation proposal 224.

In some embodiments, when calculating the proposal scores 203, 215, 225, the server 202 may calculate or otherwise generate a user cost 230, 236, 242 that predicts a route fare or other cost to a user for the transportation proposal based on a cost of completing each transportation segment of the transportation proposal. Fixed fare transportation segments of a transportation proposal (e.g. train and/or bus segments) may be known and variable fare transportation segments may be predicted based on an estimated time and distance associated with completing the transportation segment. Thus, in the illustrated embodiment, a user cost score 230 is generated for the transportation proposal 204. Additionally, a user cost score 236 is generated for the transportation proposal 218. Finally, a user cost score 242 is generated for the transportation proposal 224.

In other embodiments, to calculate the proposal scores 203, 215, 225, the server 202 may calculate or otherwise generate a network cost 232, 238, 244 that quantifies a cost to a transportation network (e.g., a TNC) of providing transportation according to the transportation proposal. For example, the network cost 232, 238, 244 may be calculated to measure or otherwise quantify a benefit of having certain modality assets (i.e., bikes, scooters, cars) available in a specific location at a specific time. For example, in the event a transportation segment requires the use of a scooter (i.e., the modality is scooter), a value quantifying the demand (e.g., user demand) for the scooter at a specific location and/or quantifying a value (e.g., in dollars) of having the scooter at the specific location may be calculated. If relocation of the scooter is desired within the transportation network (e.g., to locate the scooter at a final destination that is in high demand), a cost to move the scooter may be calculated (e.g., the deferred cost of having to pay another party to move the scooter instead of having the user take the scooter). In yet another embodiment, the network cost score may be calculated to quantify the likelihood that another user will utilize a different modality (e.g., a bike, scooter, or vehicle). In such a scenario, a higher likelihood represents a higher balancing "cost," as a different modality will have to be determined for subsequent requestors. Thus, in the illustrated embodiment, a network cost score 232 is generated for the transportation proposal 204. Additionally, a network cost score 238 is generated for the transportation proposal 218.

Finally, a network cost score 244 is generated for the transportation proposal 224. Any one of the disutility measure, the user cost score, and/or the network cost score may be combined to generate or otherwise calculate a proposal score for a transportation proposal.

In some instances, the transportation proposals 204, 218, and 224 may be further ranked or filtered according to user preferences regarding the use of certain modalities. For example, the user preferences may specify one or more preferred modalities and/or one or more disliked modalities of a user associated with the user profile. The user preferences may also specify that a user has a route preference for routes that include certain locations (e.g., faster, slower, more scenic roads) or routes that avoid certain locations (e.g., dangerous, frequently-congested roads). The user preferences may also specify that a user has preferences for certain types of routes, such as a cost preference for routes that are less expensive, a health preference for healthier routes (e.g., routes with a higher calorie expenditures), and/or an environmental preference for routes that are more environmentally friendly (e.g., have lower resulting greenhouse gas emissions). The user preferences may be user specified (e.g., may be entered and/or configured by a user associated with the user profile) and/or may be derived from user behaviors (e.g., previous acceptance and/or rejection of previous transportation proposals, previous rating of completed transportation proposals, previous). In still further implementations, the user preferences may be determined based on users other than the user associated with a particular user profile. For example, the user preferences may be determined (e.g., predicted) based on other, similar user (e.g., users with similar location, age, preferences, transportation behaviors). In such a scenario, the server 202 may access user preferences 264 associated with a user profile 262 of a user database 260 (e.g., a user profile associated with the transportation request 252) to generate the ranked list and/or ranking of the transportation proposals. For example, the user preferences may indicate that a user may be most interested in routes that involve the use of scooters, while routes that involve transit (i.e., trains) are of lesser interest. The server 202 may therefore rank transportation proposals higher that include scooters and/or that predominantly include transportation by scooter (e.g., by generating a higher and/or more preferable proposal score for such transportation proposals) As another example, the user preferences may indicate that a user prefers routes that are the fastest, and dislikes routes that involve multiple transfers. Based on any of such preferences, the server 202 may therefore rank the transportation proposal based at least in part on a total travel time (e.g., transportation proposals with shorter travel time may have higher and/or more preferable proposal scores) and whether the transportation proposal includes transportation by train (e.g., transportation proposals with transportation by train may have lower and/or less preferable proposal scores).

In some instances, the top rankings may be presented (e.g., via a graphical user interface 159) in certain organizing categories, such as: "Suggested Routes", "Fast", "Affordable", "Healthiest", "Greenest" and the like, as will be described in further detail below. To identify the transportation proposals for each of the organizing categories, one or more components of the proposal scores may be analyzed. For example, the server 202 may identify "Fast" transportation proposals as transportation proposals with the shortest overall travel times. As another example, the server 202 may identify the "Affordable" transportation proposals as transportation proposals with the lowest overall user cost. As a further example, the "Healthiest" transportation proposals may be identified based on one or more healthiness measures including at least one of calories expended following the route identified by the proposal, steps taken following the route identified by the proposal, distance walked following the route identified by the proposal, and distance traveled by bike following the route identified by the proposal. For example, healthiest transportation proposals may be identified as the transportation proposals with the highest or most preferable healthiness measures. In another example, the "Greenest" transportation proposals may be identified as the transportation proposals with the lowest resulting greenhouse gas emissions. In a still further example, the "Suggested Routes" may be identified as the transportation proposals that most closely comply with user preferences associated with the transportation request, that most closely comply with typical proposal acceptance practices, and/or that have low network costs.

The server 202 may generate the transportation rankings in real-time and transmit (e.g., in real-time or near real-time) the rankings to a graphical user-interface 259 of the user device 250. Real-time generation and transmission of the transportation proposal rankings ensures users can make accurate transportation decisions. Without real-time transportation proposal rankings being generated and transmitted by the system, users may pursue transportation proposals that are outdated and therefore do not reflect the actual marketplace conditions for corresponding modalities a user may engage when attempting to travel between the starting location and ending location identified in the transportation proposal.

The server 202 may use information stored in a vehicle database 266 when generating and/or ranking transportation proposals 204, 218, 224. In particular, the vehicle database 266 may store vehicle locations 268 in association with modalities 270. The vehicle locations 268 may specify current locations for one or more vehicles associated with the modality 270. The vehicle database 266 may also store vehicle availability 272 in association with the modality 270 and/or vehicle locations 268. The vehicle availability 272 may specify a current availability of vehicles associated with the modality 270. The vehicle database 266 may also store predicted information regarding vehicles associated with modalities. For example, the vehicle locations 268 may store predicted future locations of vehicles associated with the modality 270 and the vehicle availability 272 may include predicted future availability of vehicles associated with the modality 270.

The server 202 may utilize this information when generating transportation proposals 204. For example, the server 202 may utilize the vehicle locations 268 and vehicle availability 272 to generate transportation proposals 204, 218, 224 that utilize vehicles located in close proximity to one or more locations of interest, such as a current location of a user requesting transportation or a location from which a user will need transportation in the future (e.g., to ride in a automobile to their destination after exiting a train at a transit stop). The server 202 may also utilize the information stored by the vehicle database 266 to calculate the proposal scores 203, 215, 223. For example, the server 202 may determine, using the vehicle locations 268 and the vehicle availability 272, how many vehicles are located in a certain area when calculating the network cost scores 232, 238, 244 (e.g., to identify vehicles that should be relocated). As another example, the server 202 may utilize the vehicle locations 268 and the vehicle availability 272 to calculate the disutility measure 228 (e.g., to determine how far a user may have to walk to access a personal mobility vehicle and/or to access transit modalities such as transportation by bus and/or train). In particular, predicted vehicle locations and availability may be used to predict a likelihood that a user will be unable to use a particular modality (e.g., bikes or scooters) in the future because no further vehicles are available in that modality.

Figure 3:
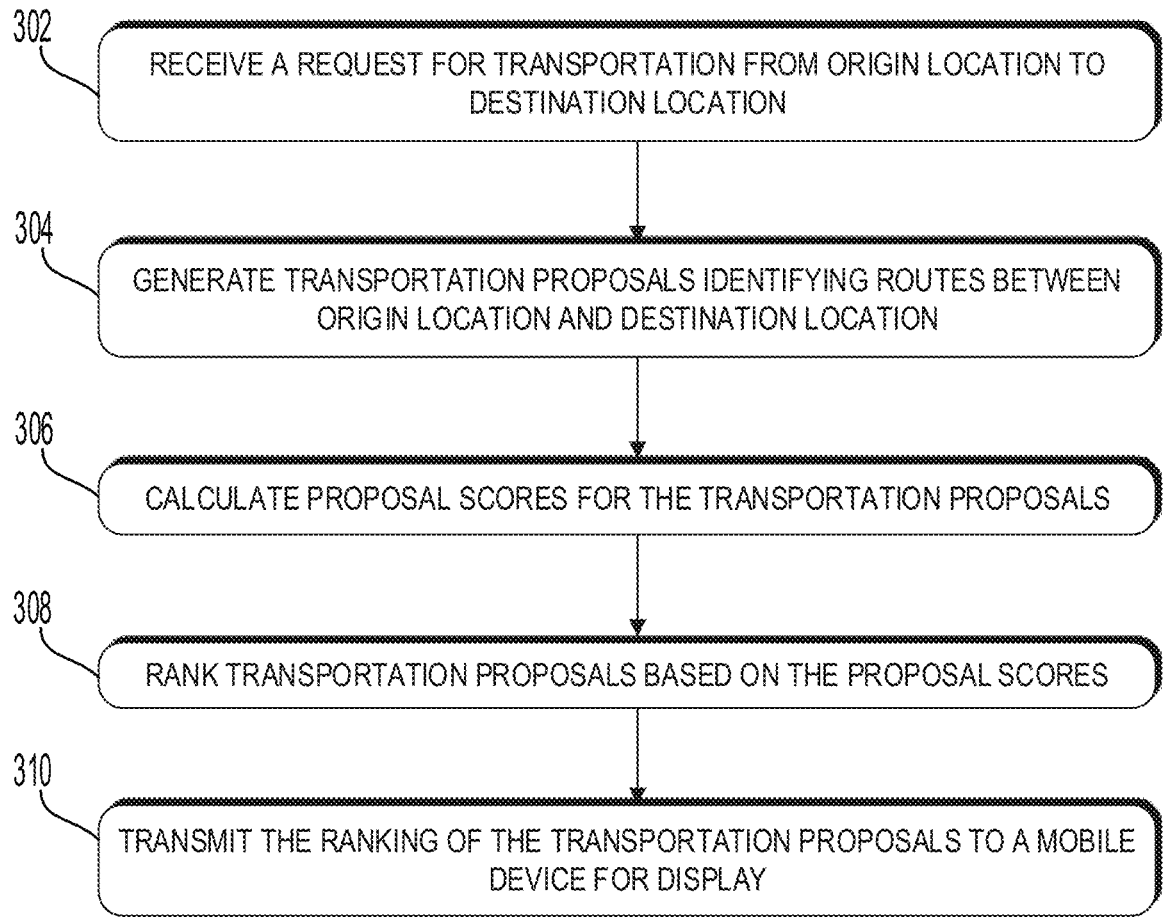
FIG. 3 illustrates a method for ranking transportation proposals, according to an exemplary embodiment of the present disclosure.

FIG. 3 depicts an exemplary method 300 for generating a ranking of multi-modal transportation proposals for real-time presentation to a computing device, such as a mobile device. The methods 300 may be implemented on a computer system, such as the system 200. For example, the methods 300 may be implemented by the server 202 to generate the ranking of multi-modal transportation proposals for real-time presentation to a computing device. The method 300 may also be implemented by a set of instructions stored on a computer readable medium that, when executed by a processor, cause the computer system to perform the method 300.

The method 300 may begin with receiving a request for transportation from an origin location to a destination location (block 302). For example, a server may receive a transportation request from a user device. The transportation request may include a first location (e.g., an origin location) and a second location (e.g., a destination location).

The server may then generate transportation proposals that identify routes between the origin location and the destination location (block 304). For example and with reference to FIG. 2, the server 202 may generate one or more transportation proposals 204, 218, 224 that identify routes between the origin location and the destination location. In certain implementations, the transportation proposals may include transportation segments that combine to form a route between the origin location and the destination location. For example, the transportation segments 206, 214, 216 may combine to form a route for transportation between the first location 254 and the second location 256. The transportation segments may each include a specific transportation modality that identifies a particular mode of transportation. For example, a transportation proposal may include a transportation segment that identifies a specific route between a first location and a second location, wherein a user is instructed to use a bike to travel along the specific route between the first and second location. Additionally and/or alternatively, the transportation proposal may include a transportation segment that identifies a specific route between a first location and a second location, wherein a user is instructed to travel within a automobile along the specific route between the first and second location. Additionally and/or alternatively, the transportation proposal may include a transportation segment that identifies a specific route between a first location and a second location, wherein a user is instructed to travel within a train along the specific route between the first and second location. Additionally and/or alternatively, the transportation proposal may include a transportation segment that identifies a specific route between a first location and a second location, wherein a user is instructed to walk along the specific route between the first and second location, before engaging or otherwise using a different type of mode of transportation. Accordingly, a generated transportation proposal may include any number of transportation segments, each of which may identify any type of transportation modality. In certain implementations, the transportation proposals may be obtained from a transportation proposal generation process, such as a process configured to generate transportation proposals in response to receiving transportation requests that specify locations between which transportation is desired (e.g., the first location and the second location).

Referring again to FIG. 3, proposal scores may be generated for the transportation proposals (block 306). For example, the server may generate proposal scores 203, 215, 225 for each of the transportation proposals 204, 218, 224 generated at block 304. The proposal scores may be generated at least in part based on a total travel time, a disutility measure, a user cost, and/or a network cost. As explained further above, the proposal scores may be generated based on further measures. Calculating the proposal scores is discussed in further detail below in connection with the method 400 and FIG. 4.

The transportation proposals may be ranked based on the proposal scores (block 308). For example, the server may rank the transportation proposal with a higher proposal score (e.g., a proposal score indicating a more desirable transportation proposal) higher than a transportation proposal with a lower proposal score (e.g., a proposal score indicating a less desirable transportation proposal). In implementations where lower proposal scores indicate more desirable transportation proposals, the server may rank transportation proposals with lower proposal scores higher than transportation proposals with higher proposal scores.

In some scenarios, the proposal scores corresponding to transportation proposals may be equivalent. In such a scenario, the system may analyze each independent feature (i.e., the disutility measure, user cost, network cost) used to calculate the proposal score to establish the ranking of the transportation proposals. For example, assume a transportation proposal A has a high proposal score and a transportation proposal B has an equally high proposal score. To determine which transportation proposal (A or B) should be ranked higher, the system may analyze the disutility measure, user cost, and/or network cost features of the proposal score of both transportation proposal A and transportation proposal B. For example, even when the overall proposal score of transportation proposal A and transportation proposal B are the same, the disutility measure of the proposal score corresponding to transportation proposal A may be higher than the disutility measure of the proposal score corresponding to transportation proposal B. Thus, transportation proposal A may receive a relatively higher rank when compared to a transportation proposal B. Stated differently, even though the complexity scores of transportation proposal A and B are the same, transportation proposal A may be more desirable to a user and may therefore deserve a higher rank.

In some embodiments, the transportation proposals may be further ranked according to user preferences. More specifically, such rankings may account for user preferences regarding certain modalities (e.g., prefers bikes to scooters, does not like buses). Such preferences may involve preferred modality, number of ride segments completed, ride service ratings, ride history, waiting time preferences, pick-up/drop-off location preferences, and the like. For example, a user may be most interested in routes that involve the use of private cars, while routes that involve public transit (i.e., trains) are of lesser importance. Based on any of such preferences, the server 202 may further rank (or re-rank) the transportation proposals.

In certain embodiments, ranking according to user preferences may be performed to identify optimal transportation proposals according to optimality criteria (e.g., Pareto optimality criteria). The optimality criteria may be determined based on the user's preferences (e.g., the user's highest, strongest, or most important preferences). For example, if a user's two highest preferences are travel time and user cost, the transportation proposals may be analyzed to identify optimal transportation proposals according to the user's highest preferences. In particular, the transportation proposals may be analyzed to identify routes that most efficiently balance travel time and user cost. The most efficient transportation proposals may include transportation proposals for which there are no other transportation proposals that both (i) have a shorter travel time and (ii) have a lower user cost.

In such implementations, optimal transportation proposals may be identified for each of multiple modalities. For example, optimal transportation proposals for each modality, such as for each transportation proposal that include a longest transportation segment (e.g., longest distance travelled and/or longest travel time) of particular modalities. For example, the analysis described in the preceding examples may be repeated to identify the optimal transportation proposals for modalities including, e.g., transportation by train, transportation by car, transportation by bus, transportation by scooter, transportation by bike, transportation by walking. In still further implementations, optimality conditions may be used to analyze multiple modalities. For instance, the optimality conditions may specify minimizing the time and/or cost of multiple modalities. As an example, a first transportation proposal may include a 5 minute walk and a 10 minute scooter ride and a second transportation proposal may include a 3 minute walk and a 7 minute scooter ride. In such an instance, the second transportation proposal may be ranked higher than the first transportation proposal because the second transportation proposal has both a shorter walk and a shorter scooter ride. As another example, a third transportation proposal may include a 7.5 minute walk and a 7.5 minute scooter ride. The third transportation proposal may therefore be comparably optimal to the first transportation proposal according to the optimality criteria because the walking time for the third transportation proposal is longer than for the first transportation proposal, while the scooter ride time is shorter than for the first transportation proposal. Also, the total travel time for the first and third transportation proposals is the same. Such comparably optimal transportation proposals may be ranked between one another according to all or part of their respective proposal scores (e.g., one or more of the disutility measure, the user cost, the network cost, etc.).

In certain implementations, ranking the transportation proposal may include removing one or more of the transportation proposals from consideration. For example, a transportation proposal may be removed from consideration if the transportation proposal includes transportation segment(s) that do not comply with a user preference. As another example, a transportation proposal may be removed based on previous selections of transportation proposals associated with a user profile. For example, if a user never selects transportation proposals that include transportation by scooter, any such transportation proposals may be removed from consideration. As a further example, transportation proposals may be removed based on operating conditions, such as locations and/or availability of vehicles. For example, a transportation proposal may be removed if the transportation proposal includes a transportation segment associated with a modality that is unlikely to be available when needed by a user. As a further example, options may be removed from consideration based on the previously-discussed optimality conditions. For example, all non-optimal transportation proposals (e.g., transportation proposal that are not optimal or comparably optimal) may be removed from consideration. As a still further example, transportation proposals may be removed from consideration if all or part of their corresponding proposal scores do not comply with certain predetermined thresholds. In particular, transportation proposals may be removed from consideration if their proposal score does not exceed a predetermined threshold and/or if their corresponding disutility measure exceeds a predetermined threshold (e.g., indicating a transportation proposal that is too inconvenient).

The ranking of the transportation proposals may be transmitted to a mobile device for display on the mobile devices (block 310). For example, the server may transmit the ranking of the transportation proposals to the user device from which the transportation request was received. The mobile device may display at least a portion of the ranking of the transportation proposals, e.g., via a graphical user interface of the mobile device. For example, the mobile device may display higher-ranked transportation proposals above lower-ranked transportation proposals. As another example, displaying a transportation proposal may include displaying an indication of the modalities (or a subset of the modalities) identified by the transportation proposal. Exemplary interfaces for displaying the ranking of the transportation proposals are discussed below in connection with FIG. 5.

In other embodiments, the client device may display the ranked transportation proposals according to one or more categories. For example, the top transportation proposal rankings may be presented in organizing categories (e.g., Suggested, Fast, Affordable, Healthiest) that cause the rankings to be displayed in a manner that is easy to read while traveling. As another example, the rankings may be color-coded or symbolically indicated according to rank (e.g., highest ranked transportation proposal is highlighted green, lowest ranked transportation proposal is highlighted red). In other instances, the user interface may present nutritional information, calorie expenditures, and/or the environmental impact (e.g., carbon footprint) corresponding to the transportation proposals.

Figure 4:
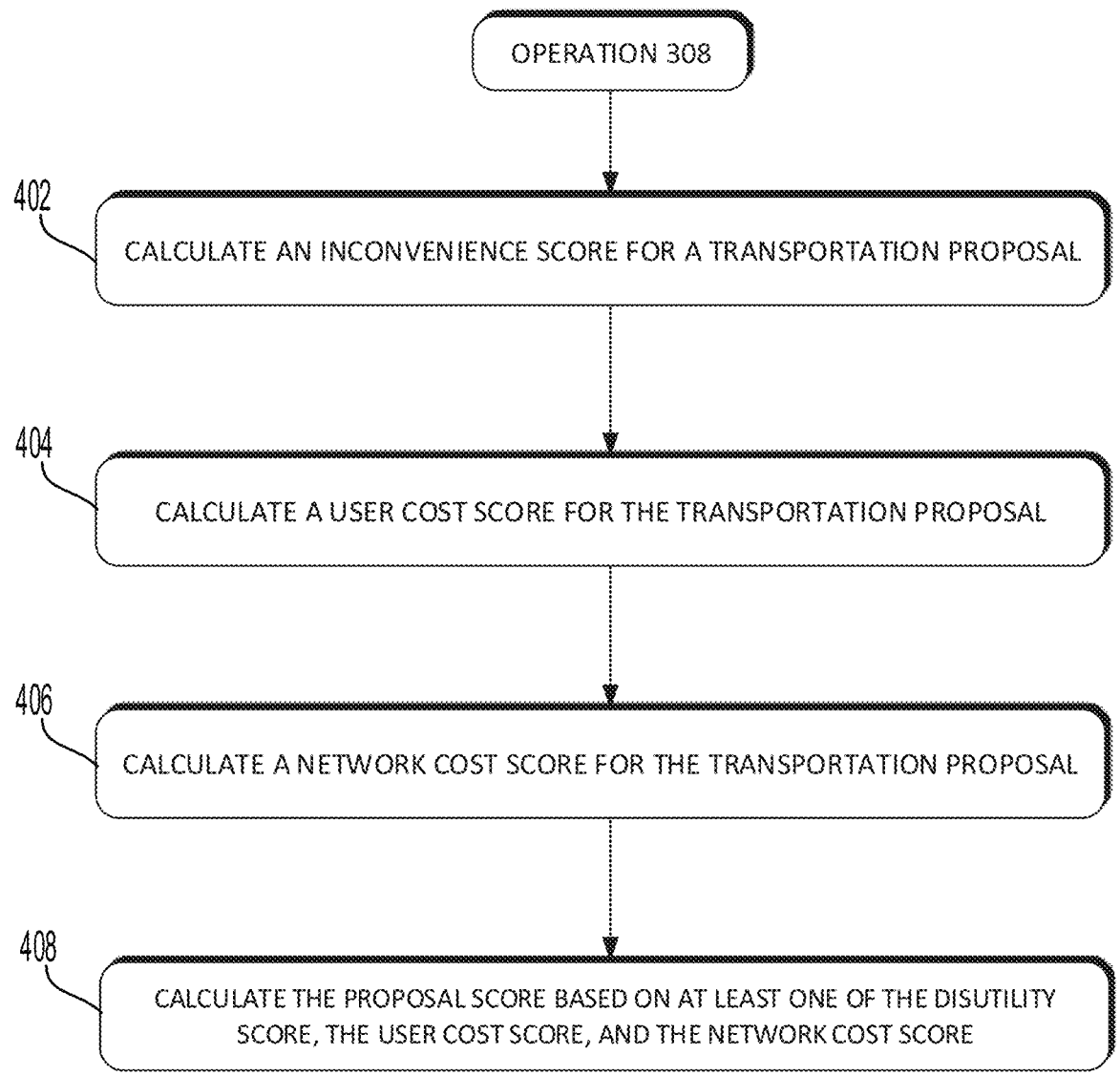
FIG. 4 illustrates a method for calculating a proposal score, according to an exemplary embodiment of the present disclosure.

FIG. 4 represents a method 400 for calculating a proposal score that indicates a difficulty of following a transportation proposal. The method 400 may be implemented on a computer system, such as the system 200. For example, the methods 400 may be implemented by the server 202 to automatically calculate proposal scores. The method 400 may also be implemented by a set of instructions stored on a computer readable medium that, when executed by a processor, cause the computer system to perform the method.

The method 400 begins with calculating a disutility measure for a transportation proposal (operation 402). As explained above, the disutility measure may be calculated to quantify a level of inconvenience that may be experienced by a user while receiving transportation according to the transportation proposal. For example, the inconvenience may include excessive walking, excessively short transportation segments, transportation segments that backtrack relative to previous transportation segments, and/or long travel times for the transportation proposal. In particular, the disutility measure 228, 234, 240 may be calculated based on one or more of a total backtracking distance of the route, a total walking distance of the route, and/or a total distance traveled by personal mobility vehicle for the route.

For example, the backtracking distanced of the route may be calculated by utilizing vector projections of transportation segments or portions thereof to determine an amount by which the distance to the destination location increases by virtue of completing the transportation segment or portions thereof. The vector projections may be repeated for at least a subset of the transportation segments or portions thereof and may be added together to determine the total backtracking distance. For example, a transportation proposal may have three transportation segments that backtrack 0.2 miles, 0.5 miles, and 0.4 miles. These backtracking distances may be added together to determine that the transportation proposal has a total backtracking distance of 1.1 miles. The disutility measure may additionally or alternatively be calculated based on a quantity of transportation segments that result in backtracking (e.g., three backtracking transportation segments in the preceding example).

As another example, the total walking distance of the route may be determined by adding together the total distance identified by transportation segments corresponding to walking modalities. For example, a transportation proposal may have three transportation segments with walking modalities: a first transportation segment where a user walks 0.3 miles to the train, a second transportation segment where the user walks 0.1 miles from the train to a scooter, and a third transportation segment where the user walks 0.1 miles from the scooter to their final destination. The walking distances for these transportation segments may then be added together to determine a 0.5 mile total walking distance for the transportation proposal. Transportation proposals with longer total walking distances may be ranked higher. For example, the total walking distance may be compared to a distance threshold (e.g., 0.5 miles, 1 mile or the like) and may be ranked higher if the total walking distance exceeds the distance threshold. In certain implementations, the disutility measure may be calculated based on a number of transportation segments with walking (e.g., three transportation segments in the preceding example). The total distance traveled by personal mobility vehicle may be determined by adding together the total distance identified by transportation segments corresponding to transportation by personal mobility vehicle (e.g., bike, scooter, skateboard). In certain implementations, the total distance traveled by personal mobility vehicle may be compared to the total walking distance. For example, if the total distance traveled by personal mobility vehicle is less than the total walking distance, it may be determined that the transportation segments corresponding to transportation by personal mobility vehicles cover too short a distance, which may inconvenience the user with excessive modality switching. In such instances, the disutility score may be ranked higher. In another example, if a ratio of the total distance traveled by personal mobility vehicle to the total walking distance is below a certain threshold, the disutility score may be ranked higher.

A user cost may also be calculated for the transportation proposal (block 404). As explained above, the user cost predicts a route fare based on a cost of completing each transportation segment of a transportation proposal.

A network cost may be calculated for the transportation proposal (operation 406). As explained above, the network cost score quantifies the systematic and network cost or benefit of having certain modality assets (i.e., bikes, scooters, cars) located in a specific location or region at a specific time. For example, the server may determine that it is worth $5 to have a scooter relocated from a location with low demand to a location with high demand for the scooter. The server may also determine that it would cost $3 to have a third party relocate the scooter to the location with high demand. However, if a transportation proposal includes a transportation segment that would relocate the scooter to the location of high demand, the server may determine that the transportation segment has a network cost of —$3 (e.g., a network benefit of $3) in avoided relocation costs. In alternative implementations, the network cost in the preceding example may be determined to be —$5, indicative of the benefit to the network rather than the avoided relocation costs. In another example, the server may determine that it is worth —$5 to have a scooter relocated from an area of high demand to an area of low demand and that it will cost $3 to have a third party relocate the scooter to the area of high demand. If a transportation proposal has a transportation segment that results in the scooter relocating from the areas of high demand to the area of low demand, the server may determine that the transportation segment has a network cost of $3 and/or $5.

Any of the calculated disutility measure, user cost, and network cost may be combined or otherwise processed to calculate a proposal score for the transportation proposal (operation 408). In one embodiment, the proposal score may be calculated under the assumption that all of the features (i.e., the disutility measure, user cost, and network cost) are of equal value and/or weight. In such a scenario, the proposal score may be a summation of such values. In other embodiments, some features may influence the desirability of a transportation proposal more than other features (e.g., at a specific period of time, according to a specific user, etc) and therefore should be weighted higher in the proposal score calculation. In such a scenario, features that more greatly influence the desirability are attributed a high weight value (e.g., a higher weighing coefficient), whereas features that provide a lower influence on the desirability may be given a lower weighted value, thereby causing the proposal score calculation may be more heavily impacted by the features of with a greater impact. In certain such scenarios, the weight values associated with features may be determined based at least in part by a predictive model (e.g., a machine learning model, a regression model). The predictive model may be trained based on transportation proposals for transportation between similar locations, or for transportation proposals accepted or rejected by users similar to a currently requesting user. In still further implementations, the higher-weighted features may be determined at least in part based on user preferences. For example, as discussed above, the user preferences may indicate types of routes (e.g., faster routes, less expensive routes, healthier routes) and/or types of modalities (e.g., preferred or disliked modalities) that a user prefers or dislikes. The higher-weighted features may then be selected to correspond to the features identified in the user preferences as significant to the desirability of transportation proposals to the user. In additional implementations, the level of higher-weighted features may include total travel time and/or travel time for particular, potentially inconvenient modalities (e.g., transportation by personal modality vehicle, transportation by bus, transportation by train), which may also be identified based on user preferences. Such higher-weighted features may cause the system to rank higher shorter transportation routes and/or transportation routes that include no inconvenient modalities and/or short uses of inconvenient modalities.

Figure 5:
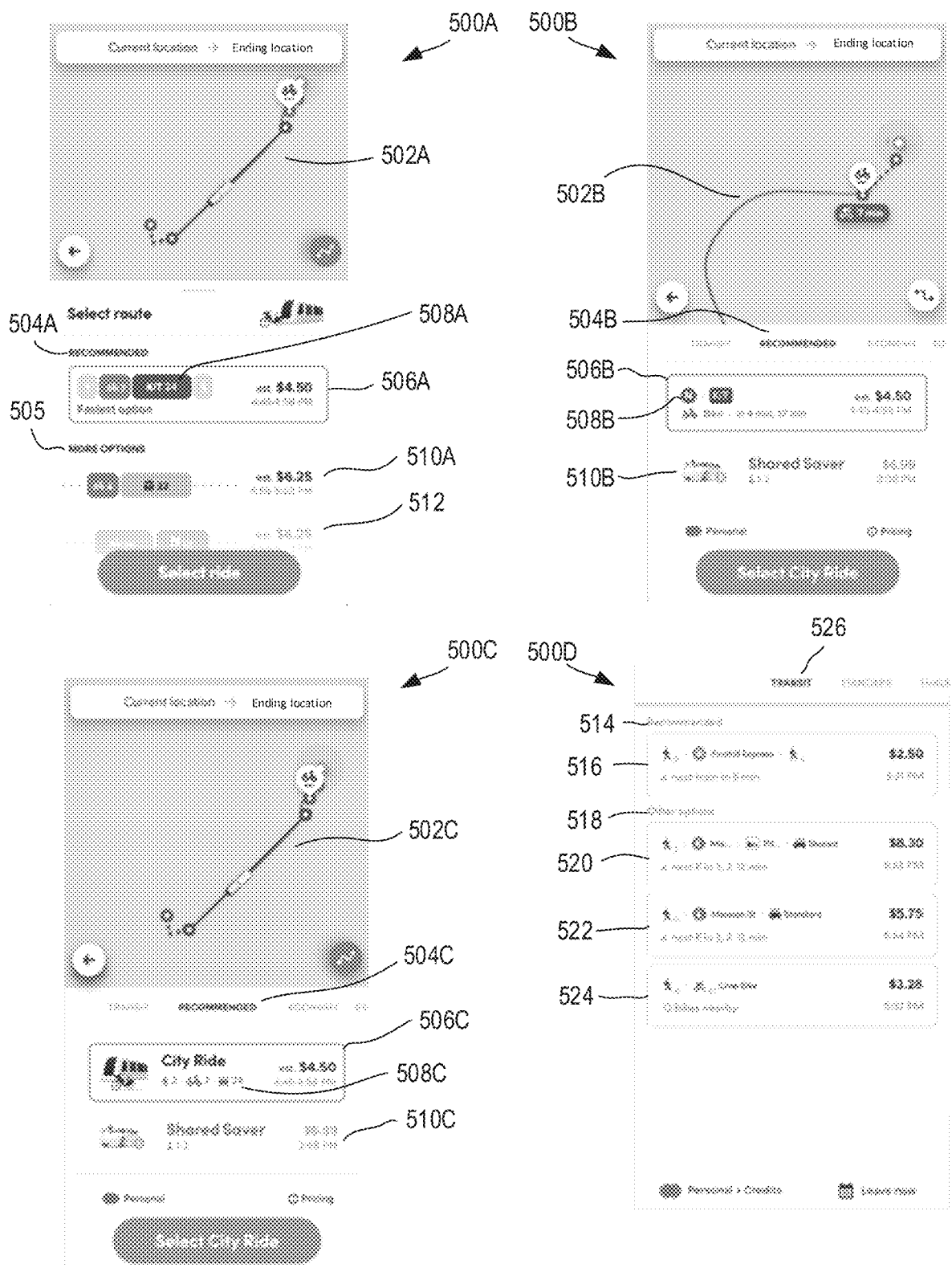
FIG. 5 illustrates user interfaces according to exemplary embodiments of the present disclosure.

FIG. 5 illustrates user interfaces 500A-D according to exemplary embodiments of the present disclosure. The user interfaces 500A-D may be implemented by a mobile device and/or a user device to display a ranking one or more transportation proposals received by the mobile device and/or user devices. For example, the user interfaces 500A-D may be used to at least partially implement block 310 of the method 300. User interfaces 500A-C include maps 502A-C that depict at least a part of a transportation route between two locations (e.g., an origin location and a destination location). For example, the maps 502A-C may depict a transportation route corresponding to a selected transportation proposal (e.g., the transportation proposal 506A-C). After receiving one or more transportation proposals, the user device may split the transportation proposals into one or more groups. For example, the user interface 500A depicts multiple transportation proposals 506A, 510A, 512. These proposals are separated into two groups: recommended proposals 504A and alternative options 505. The user interface 500A splits these groups into a vertical list, but other implementations, including implementations with more groups, may also be utilized. For example, the user interfaces 500B-C separate transportation proposals 506B-C, 510B-C into groups 504B-C selected above the transportation proposals 506B-C, 510B-C. As explained above, the groups 504B-C may include one or more of "Suggested," "Fast," "Affordable," "Healthiest," "Greenest" and the like. Further transportation proposals may be viewable by scrolling down using the user interfaces 500A-C. For example, the user interface 500D depicts multiple transportation proposals 516, 520, 522, 524. These transportation proposals 516, 520, 522, 524 are organized into further categories 514, 518 similar to the categories 504A, 505 of the user interface 500A. The transportation proposals 516, 520, 522, 524 may be viewable by scrolling down from a main screen, such as one of the screens depicted by user interfaces 500A-C. The user interface 500 D further includes additional categories 526 selectable at the top of the interface. When displayed, higher-ranked transportation proposals may be displayed above lower-ranked proposals. For example, the transportation proposal 506A may be ranked higher than the transportation proposal 510A and may therefore be displayed above the transportation proposal 510A.

Displaying the transportation proposals 506A-C, 510A-C, 512, 516, 520, 522, 524 may cause the mobile device to display one or more of the modalities included within the transportation proposal. For example, for depicted proposals, the mobile device may depict an indication of the modalities included in the proposal (e.g., a textual, visual, pictorial depiction). The mobile device may also depict further details regarding the modalities, such as a time spent using each modality, a distance covered by each modality, and/or a vehicle (e.g., a train or bus line) used in connection with each modality. For example, the user interfaces 500A-C depict indicators 508A-C for the transportation proposals 506A-C. The indicators 508A-C take different forms. For example, the indicators 508A include pictorial and textual representations of the included modalities and the time spent with each modality. In particular, the indicators 508A depicts a bicycle pictorial along with the number "7", indicating that the transportation proposal 506 *a* includes a bike modality that is expected to last seven minutes. The indicators 508A also depict a vehicle identifier "K/T" identifying the K/T train line along with the number "24", indicating that the transportation proposal 506 *a* includes a train modality that is expected to last 24 minutes. The indicators 508A also includes two walking pictorials, indicating that the transportation proposal 506A includes two walking modalities. As depicted, the pictorials are arranged in the order they will occur in the transportation proposal. The user interface 500B similarly includes textual identifiers of the "N" and "K/T" train lines, along with a visual bike identifier beneath the textual identifiers of the train lines. The indicators 508C of the user interface 500C include walking, biking, and train pictorials beneath a summary title of the transportation proposal 506C. Further, in addition to pictorial identifiers of the modalities, the depicted transportation proposals 516, 520, 522, 524 of the user interface 500D include more complete textual identifiers of certain modalities (e.g., modalities other than walking modalities). The additional information may include complete train line names, transit stop identifiers, and/or may identify a type of automobile transportation received (e.g., shared transportation with other users and/or standard transportation not associated with other users requesting transportation). In certain implementations, the indicators 508A-C may be selectable. For instance, the indicators 508A-C may be selectable to enable a user to change one of the modalities for the transportation proposal 506A-C. In such instances, when a user selects an indicator 508A-C, a menu (e.g., a drop-down or other selectable menu) may appear, enabling the user to select between alternative modalities for use with a particular segment (e.g., based on other transportation proposals or segments identified or generated in response to a received transportation request. In one example, a user may select an indicator 508A-C corresponding to a scooter modality and select, via the menu, to replace the scooter modality with a bike modality for the segment. In another example, a user may select an indicator corresponding to a train modality and may select, via the menu, to replace the train modality with an automobile modality. In still further examples, the user may select an indicator 508A-C corresponding to a modality to remove the modality from the transportation proposal 506A-C. For example, the user may select an indicator corresponding to a scooter modality that is followed by an automobile modality in the transportation proposal 506A-C and may, via the menu, remove the scooter modality from the transportation proposal 506A-C. In such examples, the other modalities of the transportation proposal 506A-C may be adjusted to compensate for the removed modality (e.g., the automobile modality may be lengthened to replace the scooter modality).

In each instance, the user interfaces 500A-D depict the modalities of the transportation proposals 506A-C, 510A-C, 512, 516, 520, 522, 524 in a compact and concise manner without unduly restricting the amount of visible information. Such a system for display can enable greater selection and visibility of potential transportation proposal options by reducing the total screen space required to display each transportation proposal. Further, such compact and concise depictions may allow a user to more quickly review and evaluate the potential transportation options, including transportation proposals that utilize different types of transportation.

Figure 6:
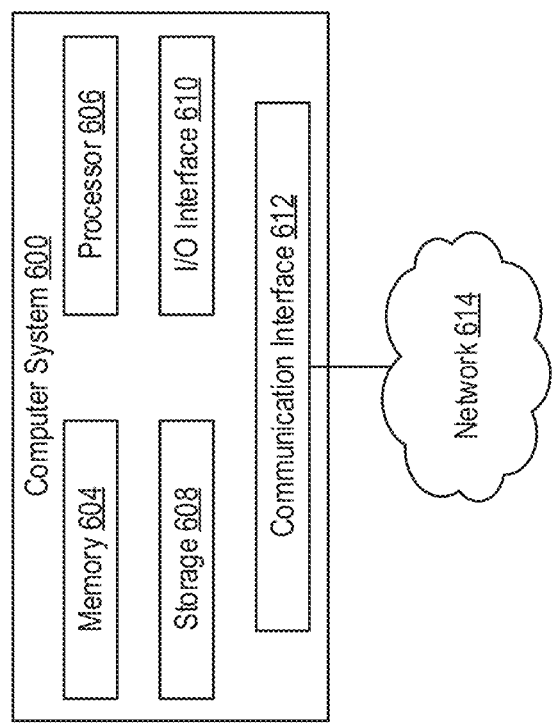
FIG. 6 illustrates a computer system, according to an exemplary embodiment of the present disclosure.

FIG. 6 illustrates an example computer system 600 that may be utilized to implement one or more of the devices and/or components of FIG. 2, such as the server 202 and/or the user device 250. In particular embodiments, one or more computer systems 600 perform one or more steps of one or more methods described or illustrated herein. In particular embodiments, one or more computer systems 600 provide the functionalities described or illustrated herein. In particular embodiments, software running on one or more computer systems 600 performs one or more steps of one or more methods described or illustrated herein or provides the functionalities described or illustrated herein. Particular embodiments include one or more portions of one or more computer systems 600. Herein, a reference to a computer system may encompass a computing device, and vice versa, where appropriate. Moreover, a reference to a computer system may encompass one or more computer systems, where appropriate.

This disclosure contemplates any suitable number of computer systems 600. This disclosure contemplates the computer system 600 taking any suitable physical form. As example and not by way of limitation, the computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 606, memory 604, storage 608, an input/output (I/O) interface 610, and a communication interface 612. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 606 includes hardware for executing instructions, such as those making up a computer program. As an example and not by way of limitation, to execute instructions, the processor 606 may retrieve (or fetch) the instructions from an internal register, an internal cache, memory 604, or storage 608; decode and execute the instructions; and then write one or more results to an internal register, internal cache, memory 604, or storage 608. In particular embodiments, the processor 606 may include one or more internal caches for data, instructions, or addresses. This disclosure contemplates the processor 606 including any suitable number of any suitable internal caches, where appropriate. As an example and not by way of limitation, the processor 606 may include one or more instruction caches, one or more data caches, and one or more translation lookaside buffers (TLBs). Instructions in the instruction caches may be copies of instructions in memory 604 or storage 608, and the instruction caches may speed up retrieval of those instructions by the processor 606. Data in the data caches may be copies of data in memory 604 or storage 608 that are to be operated on by computer instructions; the results of previous instructions executed by the processor 606 that are accessible to subsequent instructions or for writing to memory 604 or storage 608; or any other suitable data. The data caches may speed up read or write operations by the processor 606. The TLBs may speed up virtual-address translation for the processor 606. In particular embodiments, processor 606 may include one or more internal registers for data, instructions, or addresses. This disclosure contemplates the processor 606 including any suitable number of any suitable internal registers, where appropriate. Where appropriate, the processor 606 may include one or more arithmetic logic units (ALUs), be a multi-core processor, or include one or more processors 602. Although this disclosure describes and illustrates a particular processor, this disclosure contemplates any suitable processor.

In particular embodiments, the memory 604 includes main memory for storing instructions for the processor 606 to execute or data for processor 606 to operate on. As an example, and not by way of limitation, computer system 600 may load instructions from storage 608 or another source (such as another computer system 600) to the memory 604. The processor 606 may then load the instructions from the memory 604 to an internal register or internal cache. To execute the instructions, the processor 606 may retrieve the instructions from the internal register or internal cache and decode them. During or after execution of the instructions, the processor 606 may write one or more results (which may be intermediate or final results) to the internal register or internal cache. The processor 606 may then write one or more of those results to the memory 604. In particular embodiments, the processor 606 executes only instructions in one or more internal registers or internal caches or in memory 604 (as opposed to storage 608 or elsewhere) and operates only on data in one or more internal registers or internal caches or in memory 604 (as opposed to storage 608 or elsewhere). One or more memory buses (which may each include an address bus and a data bus) may couple the processor 606 to the memory 604. The bus may include one or more memory buses, as described in further detail below. In particular embodiments, one or more memory management units (MMUs) reside between the processor 606 and memory 604 and facilitate accesses to the memory 604 requested by the processor 606. In particular embodiments, the memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory implementations, this disclosure contemplates any suitable memory implementation.

In particular embodiments, the storage 608 includes mass storage for data or instructions. As an example and not by way of limitation, the storage 608 may include a hard disk drive (HDD), a floppy disk drive, flash memory, an optical disc, a magneto-optical disc, magnetic tape, or a Universal Serial Bus (USB) drive or a combination of two or more of these. The storage 608 may include removable or non-removable (or fixed) media, where appropriate. The storage 608 may be internal or external to computer system 600, where appropriate. In particular embodiments, the storage 608 is non-volatile, solid-state memory. In particular embodiments, the storage 608 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 608 taking any suitable physical form. The storage 608 may include one or more storage control units facilitating communication between processor 606 and storage 608, where appropriate. Where appropriate, the storage 608 may include one or more storages 608.

Although this disclosure describes and illustrates particular storage, this disclosure contemplates any suitable storage.

In particular embodiments, the I/O Interface 610 includes hardware, software, or both, providing one or more interfaces for communication between computer system 600 and one or more I/O devices. The computer system 600 may include one or more of these I/O devices, where appropriate. One or more of these I/O devices may enable communication between a person and computer system 600. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 610 may include one or more device or software drivers enabling processor 606 to drive one or more of these I/O devices. The I/O interface 610 may include one or more I/O interfaces 610, where appropriate. Although this disclosure describes and illustrates a particular I/O interface, this disclosure contemplates any suitable I/O interface or combination of I/O interfaces.

In particular embodiments, communication interface 612 includes hardware, software, or both providing one or more interfaces for communication (such as, for example, packet-based communication) between computer system 600 and one or more other computer systems 600 or one or more networks 614. As an example and not by way of limitation, communication interface 612 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 614 and any suitable communication interface 612 for it. As an example and not by way of limitation, the network 614 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), or any other suitable wireless network or a combination of two or more of these. Computer system 600 may include any suitable communication interface 612 for any of these networks, where appropriate. Communication interface 612 may include one or more communication interfaces 612, where appropriate. Although this disclosure describes and illustrates a particular communication interface implementations, this disclosure contemplates any suitable communication interface implementation.

The computer system 600 may also include a bus. The bus may include hardware, software, or both and may communicatively couple the components of the computer system 600 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. The bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A system comprising:
a processor; and
a memory storing instructions which, when executed by the processor, cause the processor to:
receive, from a computing device, a request for transportation from an origin location to a destination location;
generate at least a first proposal and a second proposal, wherein each proposal identifies a route for transportation between the origin location and the destination location, each of the first proposal and the second proposal including:
(i) at least one segment corresponding to a portion of the route; and
(ii) at least one modality identifying a type of transportation for each of the at least one segments;
calculate proposal scores for each of the first and second proposals, wherein the proposal score for each proposal is calculated based on a disutility measure of the proposal, the disutility measure being calculated at least in part (a) to measure a total backtracking distance for the route identified by the proposal and (b) based on at least one of a total walking distance for the route identified by the proposal and a total distance traveled by personal mobility vehicle for the route identified by the proposal, wherein (b) is calculated based on a comparison of a total distance traveled by personal mobility vehicle to a total walking distance for the route identified by the proposal;
rank the first and second proposals based on the proposal scores; and
transmit the ranking of the first and second proposals to the computing device, wherein the computing device displays at least an indication of the ranking of the first and second proposals.

2. The system of claim 1, wherein the personal mobility vehicle includes one or more of a scooter and a bike.

3. The system of claim 1, wherein the proposal scores are further calculated based on at least one of: total travel times of the first and second proposals, prices of the first and second proposals, and network costs of the first and second proposals.

4. The system of claim 1, wherein the proposal scores are calculated based on a health measure of routes identified by the first and second proposals selected from the group consisting of: calories expended, steps taken, distance walked, and distance traveled by bike.

5. The system of claim 1, wherein the memory stores further instructions which, when executed by the processor before sending the first and second proposals, cause the processor to:
remove at least one of the first proposal and the second proposal.

6. The system of claim 5, wherein the at least one of the first proposal and second proposal are removed based on at least one of (i) previous selections of multi-modal proposals associated with the computing device and (ii) operating conditions for at least one modality of the at least one of the first and second proposals.

7. The system of claim 1,
wherein the computing device displays an indication of at least one modality of the first and second proposals.

8. The system of claim 1, wherein the memory stores further instructions which, when executed by the processor, cause the processor to:
send, for display, the first and second proposals to the computing device according to the ranking.

9. A method comprising:
receiving, from a computing device, a request for transportation from an origin location to a destination location;
generating at least a first proposal and a second proposal, wherein each proposal identifies a route for transportation between the origin location and the destination location, each of the first proposal and the second proposal including:
(i) at least one segment corresponding to a portion of the route; and
(ii) at least one modality identifying a type of transportation for each of the at least one segments;
calculating proposal scores for each of the first and second proposals, wherein the proposal score for each proposal is calculated based on a disutility measure of the proposal, the disutility measure being calculated at least in part (a) to measure a total backtracking distance for the route identified by the proposal and (b) based on at least one of a total walking distance for the route identified by the proposal and a total distance traveled by personal mobility vehicle for the route identified by the proposal, wherein (b) is calculated based on a comparison of a total distance traveled by personal mobility vehicle to a total walking distance for the route identified by the proposal;
ranking the first and second proposals based on the proposal scores; and
transmitting the ranking of the first and second proposals to the computing device, wherein the computing device displays at least an indication of the ranking of the first and second proposals.

10. The method of claim 9, wherein the personal mobility vehicle includes one or more of a scooter and a bike.

11. The method of claim 9, wherein the proposal scores are further calculated based on at least one of: total travel times of the first and second proposals, prices of the first and second proposals, and network costs of the first and second proposals.

12. The method of claim 9, wherein the proposal scores are calculated based on a health measure of routes identified by the first and second proposals selected from the group consisting of: calories expended, steps taken, distance walked, and distance traveled by bike.

13. The method of claim 9, further comprising:
sending, for display, the first and second proposals to the computing device according to the ranking.

14. The method of claim 13, further comprising, before sending the first and second proposals, removing at least one of the first and second proposals.

15. The method of claim 14, wherein the at least one of the first and second proposals are removed based on at least one of (i) previous selections of proposals associated with the computing device and (ii) operating conditions for at least one modality of the at least one of the first and second proposals.

16. A non-transitory, computer-readable medium storing instructions which, when executed by a processor, cause the processor to:
receive, from a computing device, a request for transportation from an origin location to a destination location;
generate at least a first proposal and a second proposal, wherein each proposal identifies a route for transportation between the origin location and the destination location, each of the first proposal and the second proposal including:
(i) at least one segment corresponding to a portion of the route; and
(ii) at least one modality identifying a type of transportation for each of the at least one segments;
calculate proposal scores for each of the first and second proposals, wherein the proposal score for each proposal is calculated based on a disutility measure of the proposal, the disutility measure being calculated at least in part (a) to measure a total backtracking distance for the route identified by the proposal and (b) based on at least one of a total walking distance for the route identified by the proposal and a total distance traveled by personal mobility vehicle for the route identified by the proposal, wherein (b) is calculated based on a comparison of a total distance traveled by personal mobility vehicle to a total walking distance for the route identified by the proposal;

rank the first and second proposals based on the proposal scores; and transmit the ranking of the first and second proposals to the computing device, wherein the computing device displays at least an indication of the ranking of the first and second proposals.

* * * * *